United States Patent
Cordie et al.

(10) Patent No.: US 12,411,209 B2
(45) Date of Patent: Sep. 9, 2025

(54) METHOD FOR SEAT OCCUPANCY DETECTION

(71) Applicant: IEE INTERNATIONAL ELECTRONICS & ENGINEERING S.A., Echternach (LU)

(72) Inventors: Janine Cordie, Echternacherbrück (DE); Andreas Diewald, Kell am See (DE); Oscar Gomez, Paris (FR); Alan Koehler, Igel (DE); Jochen Landwehr, Trier (DE); Parth Raj Singh, Luxembourg (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 355 days.

(21) Appl. No.: 17/787,833

(22) PCT Filed: Dec. 15, 2020

(86) PCT No.: PCT/EP2020/086227
§ 371 (c)(1),
(2) Date: Jun. 21, 2022

(87) PCT Pub. No.: WO2021/122603
PCT Pub. Date: Jun. 24, 2021

(65) Prior Publication Data
US 2023/0026131 A1    Jan. 26, 2023

(30) Foreign Application Priority Data
Dec. 20, 2019    (LU) .................................. LU101570

(51) Int. Cl.
*G01S 7/35*    (2006.01)
*B60N 2/00*    (2006.01)
(Continued)

(52) U.S. Cl.
CPC ............ *G01S 7/356* (2021.05); *B60N 2/0021* (2023.08); *B60N 2/266* (2023.08); *B60N 2/267* (2023.08);
(Continued)

(58) Field of Classification Search
CPC ........ G01S 7/356; G01S 13/931; G01S 7/354; G01S 7/414; G01S 13/00–04;
(Continued)

(56) References Cited

U.S. PATENT DOCUMENTS

| | | | |
|---|---|---|---|
| 9,671,492 B2 * | 6/2017 | Diewald | ........... B60R 21/01534 |
| 2010/0152600 A1 * | 6/2010 | Droitcour | ............ A61B 5/7221 |
| | | | 600/534 |
| 2017/0039835 A1 * | 2/2017 | Brankovic | ........... H01Q 19/108 |

FOREIGN PATENT DOCUMENTS

EP        3508871 A1    7/2019

OTHER PUBLICATIONS

Krim, H., & Viberg, M. (1996). Two decades of array signal processing research: the parametric approach. In IEEE Signal Processing Magazine (vol. 13, No. 4, pp. 67â94). IEEE. https://doi.org/10.1109/79.526899 (Year: 1996).*

(Continued)

*Primary Examiner* — Vladimir Magloire
*Assistant Examiner* — Remash R Guyah
(74) *Attorney, Agent, or Firm* — Reising Ethington P.C.

(57) ABSTRACT

A method for occupancy detection for at least one vehicle seat, using at least one transmit antenna and a plurality of receive antennas, includes: emitting a detection signal with each transmit antenna onto at least one vehicle seat, which detection signal is a frequency-modulated continuous-wave radar signal, and receiving with each receive antenna a reflected signal; recording sample data representing the reflected signal, the sample data having M channels, with (Continued)

$M = N_1 \cdot N_2$, where $N_1$ is the number of transmit antennas and $N_2$ is the number of receive antennas; for each channel, removing a component from the sample data that corresponds to a reflection from a static object; and applying a frequency estimation method to the sample data to at least implicitly determine at least one angle of arrival $\theta_i$ corresponding to a position of an occupant on a vehicle seat.

11 Claims, 5 Drawing Sheets

(51) Int. Cl.
| | |
|---|---|
| *B60N 2/26* | (2006.01) |
| *G01S 13/04* | (2006.01) |
| *B60R 21/015* | (2006.01) |
| *G01S 7/41* | (2006.01) |
| *G01S 13/88* | (2006.01) |
| *G01S 13/931* | (2020.01) |

(52) U.S. Cl.
CPC .......... *G01S 13/04* (2013.01); *B60N 2210/16* (2023.08); *B60N 2230/30* (2023.08)

(58) Field of Classification Search
CPC ........... G01S 13/88–93; G01S 7/35–41; B60R 21/01534; B60R 21/01–015; B60R 21/0152–0155; B60N 2/002–0028; G08B 21/22–24
USPC .... 342/27; 340/425.5, 438, 439, 457, 573.1; 180/271, 272, 273; 280/734, 735; 701/1, 701/36, 45, 49
See application file for complete search history.

(56) References Cited

OTHER PUBLICATIONS

Alizadeh, Mostafa, Hajar Abedi, and George Shaker. "Low-Cost Low-Power in-Vehicle Occupant Detection with Mm-Wave FMCW Radar." 2019 IEEE Sensors. IEEE, 2019. 1-4. Web. (Year: 2019).*
Paulraj, Arogyaswami et al. "Subspace Methods for Directions-of-Arrival Estimation." Handbook of Statistics, Signal Processing and Its Applications. N.p., 1993. Print. (Year: 1993).*
Krim, H., & Viberg, M. (1996). Two decades of array signal processing research: the parametric approach. In IEEE Signal Processing Magazine (vol. 13, No. 4). IEEE. https://doi.org/10.1109/79.526899 (Year: 1996).*
International Search Report corresponding to International Application No. PCT/EP2020/086227, dated Jan. 18, 2021, 4 pages.
Written Opinion corresponding to International Application No. PCT/EP2020/086816, dated Jan. 18, 2021, 7 pages.
Alizadeh Mostafa et al., "Low-cost low-power in-vehicle occupant detection with mm-wave FMCW radar", 2019 IEEE Sensors, IEEE, Oct. 27, 2019, pp. 1-4.
Krim H et al., "Two decades of array signal processing research: the parametric approach", IEEE Signal Proces Sing Magazine, vol. 13, No. 4, Jul. 1, 1996, pp. 67-94.
N K Bose et al., "Subspace Methods for Directions-of-Arrival Estimation", Handbook of Statistics, Jan. 1, 1993, pp. 693-739.

* cited by examiner

METHOD FOR SEAT OCCUPANCY DETECTION

TECHNICAL FIELD

The invention generally relates to a method for occupancy detection.

BACKGROUND

Reliable occupancy detection of vehicle seats in a vehicle like a car can be required due to a variety of reasons. Depending on the occupancy of a seat, seat belt reminders can be triggered or the air bag function can be adapted. Occupancy detection and classification systems known in the art are often foil-based sensors, which are integrated in every single seat and are adapted for detecting pressure. More recently, occupancy detection systems have also been implemented with a radar sensor which is mounted at the ceiling of the car. There are several advantages of using radar sensors for occupancy detection. They do not require installation into the individual seat, thereby also eliminating any cables running into the seats. This greatly simplifies interior car designs where seats can be folded down, rotated or adjusted in a wide range. Additionally, radar sensors which measure Doppler frequency shifts can provide information on the movement of the target, thus enabling an inanimate object to be distinguished from a person. This also enables detection of barely visible motion like the chest movement during respiration. Apart from seat belt reminder functions, it is therefore also possible to e.g. detect an infant or newborn left behind in the vehicle and trigger an alarm.

If several seats are surveyed with a single radar system, a MIMO (multiple input multiple output) radar system can be used, which comprises several transmit antennas and several receive antennas. For instance, a frequency-modulated continuous-wave (FMCW) signal is emitted by each transmit antenna and the reflected signal is received by each receive antenna. The data samples can be processed by Fast Fourier Transform (FFT) to gain information on target range, velocity and angle. Information on the angle of incidence is essential for distinguishing occupation of different seats which are disposed at a similar distance from the radar system. However, a common MIMO system normally comprises 4 to 6 receive antennas and up to 3 transmit antennas and reaches only a poor angular resolution when applying standard signal processing methods like FFT. This does not allow for a good separation of targets especially if these are close together as it is the case for people sitting on the rear bench shoulder to shoulder.

Another problem arises when static objects are exposed to vibrations and other movements when the vehicle is running. Since the currently known systems are based on differentiating between humans and inanimate objects with the help of occupant movements, moving objects can lead to misclassifications.

SUMMARY

It is thus an object of the present invention to provide efficient means for accurate radar-based occupancy detection in a vehicle.

This problem may be solved by a method according to claim 1.

The invention provides a method for occupancy detection for at least one vehicle seat. The vehicle seat is normally a seat in a road vehicle like a passenger car or a truck. It may be a rear seat or a front seat and the term "seat" includes separate seats as well as rear bench seats. In case of several vehicle seats, these may be front seats and/or rear seats. According to the method it is at least determined whether or not the respective vehicle seat is occupied, either by an object or by a person. Preferably, a person can be distinguished from an inanimate object.

The method uses at least one transmit antenna and a plurality of receive antennas. Each antenna may also be referred to as a radar antenna and is configured to emit or receive an electromagnetic signal having a radar frequency or radio frequency. In the context of this invention a "radio frequency" may in particular be between 300 MHz and 200 GHz. All antennas may be part of a detection system. Without being limited to this configuration, the system may at least partially be disposed in or underneath a ceiling of the vehicle.

It should be noted that the sequence in which the steps are mentioned hereinafter may differ from the sequence in which they are performed. Unless explicitly mentioned or one step requires the result of another step, the sequence could be changed or some steps could be performed simultaneously.

The method comprises emitting a detection signal with each transmit antenna onto at least one vehicle seat, which detection signal is a frequency-modulated continuous-wave radar signal, and receiving a reflected signal with each receive antenna. The detection signal is a frequency-modulated continuous-wave signal, i.e. it is a continuous wave having a frequency that is modulated. For instance, the detection signal may be chirped so that the frequency increases or decreases over one period. It normally changes in a linear manner as a function of time, starting from a base frequency and rising to a maximum frequency. Then, at the start of the next period or chirp, the signal starts again at the base frequency. The difference between the base frequency and the upper frequency is the bandwidth of the signal. The detection signal has a radio frequency, or more specifically, it comprises a plurality of radio frequencies. In particular, these may be from the W band (75-110 GHz).

A reflected signal is received with each receive antenna. It is understood that the reflected signal is at least partially occurring in response to the detection signal, i.e. a portion of the detection signal is reflected by at least one target and received by the receive antennas. While reference is made here to "a" detection signal and "a" response signal, this is to be understood as referring to at least one signal, i.e. if the antenna arrangement comprises a plurality of transmit antennas, different detection signals could be transmitted by different transmit antennas and generally different reflected signals can be received by different antennas. Each transmit antenna transmits a detection signal onto at least one vehicle seat. Normally, the method is intended for occupancy detection on a plurality of vehicle seats, in which case each transmit antenna transmits the detection signal onto a plurality of vehicle seats. At least a portion of the transmit signal is either reflected by the vehicle seat(s) or an occupant or an inanimate object placed on a seat.

Another step of the method comprises recording sample data representing the reflected signal, the sample data having M channels, with $M=N1 \cdot N2$, where N1 is the number of transmit antennas and N2 is the number of receive antennas. Normally, the sample data correspond to numeric values representing an output of a mixer which mixes the signal received at a receive antenna with the detection signal. It is understood that the sample data are recorded at a certain sample rate, wherefore they represent the reflected signal at certain, discrete points in time. The sample data have a channel for each combination of a transmit antenna and a receive antenna. Although certain parts of the sample data can be assigned to one of the channels, this does not imply that all sample data belonging to one channel are stored as a single, coherent group of data in a memory. If several transmit antennas are employed, there are also several channels for each receive antenna, namely one for each combination of a transmit antenna with this receive antenna. In this case, measures can be taken to ensure that only sample data corresponding to one combination of a transmit antenna and a receive antenna are assigned to one channel. The sample data can be visualised as a radar data cube, where one dimension corresponds to the channel number. Another dimension corresponds to the number of sample points during one block (e.g. one chirp for a single transmit antenna or N1 chirps sequentially transmitted by N1 transmit antennas in case of time division multiplexing). Generally, a block comprises one modulation period for each transmit antenna. A third dimension corresponds to the number of blocks that have been sampled. A block is also referred to as "fast time", while the total number of blocks is referred to as "slow time".

Further, the method comprises, for each channel, removing a component from the sample data that corresponds to a reflection from a static object. This component can also be referred to as a static background, which can be disregarded for occupancy detection, because an occupant will never be completely motionless. The simplest way to do this would be to calculate the average of a certain sample point (e.g. the first sample point) over all blocks and then subtract this average from the respective sample point in all blocks. In other words, a constant background that is present in all frames is removed. More generally, a high pass filter could be applied.

Then, a frequency estimation method is applied to the sample data to at least implicitly determine at least one angle of arrival corresponding to a position of an occupant on a vehicle seat. The angle of arrival is an angle with respect to the orientation of the transmit antennas and represents at least an approximation of the direction in which an occupant is located. In other words, while prior art normally uses an FFT over the channels (also referred to as angle FFT) to determine the angle of arrival, a frequency estimation method is used here. At least some frequency estimation methods can also be referred to as beamforming methods. In this context, "beamforming" only refers to signal reception, not signal transmission. At least some of these are adaptive beamforming methods. In general, standard beamforming in the receive channels refers to connecting the outputs of receive antennas analoguely or digitally (with phase shifts) in order observe only one single angle and to suppress all other angles of arrival. FFT, which is a frequency determination method and not a frequency estimation method, allows to observe all angles of incidence separately in the digital beamforming. Although it is deterministically correct, it has a lower resolution than a frequency estimation method by the same bandwidth (which only "estimates" the frequency). As will become apparent in the following, application of a frequency estimation method to determine at least one angle of arrival increases the angular resolution, which is particularly advantageous if two or more reflecting targets are relatively close together. In other words, to angles of arrival can be distinguished and determined with increased accuracy, which enables to separate two objects even in cases where this is impossible using angle FFT. The angle of arrival is determined at least implicitly, i.e. it is either determined explicitly (directly) or a quantity is determined from which the angle of arrival can be calculated unambiguously.

Preferably, before applying the frequency estimation method, a range gating is performed for each channel. "Range gating" means that not all sample data are taken into account, but only those corresponding to a certain range or certain ranges. In a first step, the sample data are transformed into a range representation. This is normally done by performing an FFT over each block of the transmitted signal, e.g. each chirp or each sequence of chirps transmitted by multiple transmit antennas. After the FFT, the transformed data can be stored as data samples, each of which corresponds to a certain range or distance from the antenna array. Then, only a portion of the sample data corresponding to a predefined range interval is considered, which range interval includes a potential position of an occupant. Since the occupant, if present, is seated on a seat, and the distance of the seat does not change in the case of a rear bench, it is possible to predict the distance of the occupant at least approximately. A range interval can be defined accordingly and any sample data corresponding to a position outside this interval can be disregarded. The disregarded data can be deleted or not be stored in the first place. It is understood that the boundaries of the range interval depend on the position of the antennas with respect to the at least one seat. The length of the range interval may e.g. be between 0 cm and 150 cm, in particular between 30 cm and 60 cm. Normally, the range interval corresponds to a plurality of samples, but it could also correspond to a single sample.

In general, various configurations can be used for the receiving antennas. It is preferred, though, that the receiving antennas are arranged as a uniform linear array. In a linear array, the antennas are arranged along a straight line. In a uniform linear array, the distance d between two neighboring antennas is the same for all antennas. Although other configurations can be used in context with the present invention; the use of a uniform linear array (ULA) simplifies the analysis of the reflected signal and the application of the frequency estimation method.

According to one embodiment, only one transmit antenna is employed, so that the radar system is a SIMO (single input multiple output) system, alternatively a plurality of transmit antennas can be used. Thus, the number of antennas for a certain number of channels can be reduced. E.g. a system of 2 transmit antennas and 4 receive antennas (total: 6 antennas) has the same number of channels as a system of 1 transmit antenna and 8 receive antennas (total: 9 antennas). For instance, if a ULA of 4 receive antennas spaced apart by a distance d is combined with two transmit antennas spaced by a distance 4d, this gives rise to the same phase shifts as with 1 transmit antenna and 8 receive antennas.

If several transmit antennas are used, it is preferred that transmit signals from different transmit antennas are separated by time division multiplexing. In other words, only one antenna is active (i.e. sends a nonzero signal) at a time and the antennas are active alternatingly. However, other forms of multiplexing could also be applied, e.g. frequency division multiplexing or space division multiplexing.

Various frequency estimation methods can be applied. For instance, a Bartlett method or Bartlett beamforming could be used, but other methods are preferred in order to provide better angular resolution. According to one embodiment, the frequency estimation method is a Capon method. The Capon method is also known as the Minimum Variance Distortionless Response (MVDR) algorithm. This method attempts to minimize the power contributed by noise and any signals coming from other directions than a scanning angle θ, while maintaining a constant gain for the input signal. In a first step, the Capon method comprises calculating a sample covariance matrix $\hat{R}$ with $$\hat{R} = \frac{1}{K}\sum_{k=0}^{K-1} x[k]x^H[k]$$

wherein x[k] is an M-dimensional output vector representing the sample data in each channel in range representation and K is the number of data samples considered. As mentioned above, range gating may be applied before the frequency estimation is performed, so that the number of data samples that are considered can be smaller than the number of data samples originally recorded. The output vector x[k] has a dimension M×1, with M corresponding to the number of channels. Each data sample k can be associated with a specific range. Thus, the sum in the above equation can be regarded as a sum along a range interval. The elements of the covariance matrix k show the correlation (or lack of correlation) between the output in different channels.

In another step, an inverse sample covariance matrix $\hat{R}^{-1}$ is calculated. This is of course the inverse matrix of the above-mentioned sample covariance matrix.

In yet another step, a steering vector a(θ) for each of a plurality of scanning angles θ is generated. The steering vector a(θ) of dimensions M×1 corresponding to a scanning angle θ is given by a column vector and for a uniform linear array with M elements it is defined as $$a(\theta) = \begin{bmatrix} 1 \\ e^{j\left(\frac{2\pi d \sin\theta}{\lambda}\right)} \\ \vdots \\ e^{j\left(\frac{2\pi(M-1)d\sin\theta}{\lambda}\right)} \end{bmatrix} \in \mathbb{C}^{M \times 1}$$

wherein λ is the wavelength of the reflected signal and d is the distance between two receiving antennas. It is understood that the scanning angles may be selected from an interval that comprises all possible positions of an occupant while excluding angles were no occupant can be expected. It will be understood that the above definition of the steering vector is valid for a SIMO ULA with M receive antennas as well as for a MIMO ULA with M=N1·N2 channels.

When the covariance matrix and the steering vector have been determined, a Capon power spectrum $P_{Cap}(\theta)$ is calculated with $$P_{Cap}(\theta) = \frac{1}{a^H(\theta)\hat{R}^{-1}a(\theta)}$$

The at least one angle of arrival $\theta_i$ can then be deduced by examining the peaks of the Capon power spectrum $P_{Cap}(\theta)$. It can be shown that the angular resolution can be significantly improved with the Capon method with respect to e.g. the Bartlett method.

According to another embodiment, the frequency estimation method is a MUSIC (multiple signal classification) method. It uses the orthogonality of the underlying signal and noise subspaces to estimate the angle of arrival. The sample covariance matrix $\hat{R}$ can be divided into a signal subspace and a noise subspace by eigendecomposition. In a first step, this method also comprises calculating the sample covariance matrix $\hat{R}$ as described above with respect to the Capon method. However, the inverse sample covariance matrix is not needed in this case.

Instead, the eigenvalues and eigenvectors of the sample covariance matrix $\hat{R}$ are calculated. Suitable numerical methods for determining eigenvalues and eigenvectors of a matrix are known in the art and therefore will not be discussed here. Assuming that all columns of $\hat{R}$ are linearly independent, there will be M eigenvectors with corresponding eigenvalues, some of which eigenvalues could possibly be identical.

Then, the eigenvalues are sorted in descending order and, with D being a number of targets, M–D smallest eigenvalues and corresponding eigenvectors are selected to determine a noise subspace G. In other words, the M–D eigenvectors with the smallest eigenvalues span the noise subspace G. The remaining D eigenvectors span a signal subspace.

Further steps depend on the type of MUSIC method that is employed. According to one embodiment, which can be referred to as a spectral MUSIC method, the method further comprises, after determining the noise subspace, generating a steering vector a(θ) for each of a plurality of scanning angles θ. These terms have already been explained above with reference to the Capon method.

Then, a MUSIC power spectrum $P_{MUSIC}(\theta)$ is calculated with $$P_{MUSIC}(\theta) = \frac{a^H(\theta)a(\theta)}{a^H(\theta)GG^H a(\theta)}$$

If a(θ) is normalized, this can be simplified as:

$$P_{MUSIC}(\theta) = \frac{1}{a^H(\theta)GG^H a(\theta)}$$

The at least one angle of arrival $\theta_i$ can then be deduced by examining the peaks of the MUSIC power spectrum $P_{MUSIC}(\theta)$. In general, the angular resolution can still be improved compared to the Capon method.

A different embodiment can be referred to as a root-MUSIC method. Here, the method comprises, after determining the noise subspace, calculating the roots $z_i$ of a root-MUSIC polynomial J(z) with $$J(z) = z^{M-1}p^T(z^{-1})GG^R p(z)$$

Herein, $$p(z) = \begin{bmatrix} z^0 \\ \vdots \\ z^{M-1} \end{bmatrix},$$

i.e. it is a column vector with elements 1, z, ..., $z^{M-1}$, and each root $z_i$ corresponds to an angle of arrival $\theta_i$. Algorithms for determining the roots (i.e. the zeros) of a polynomial are known in the art and therefore will not be discussed here.

When the roots have been determined, an angle of arrival $\theta_i$ can be (explicitly) determined for at least one root $z_i$, normally for a plurality of roots or even for all roots. For a linear uniform array, the angle of arrival $\theta_i$ is determined as $$\theta_i = \arcsin\left(\frac{\lambda}{2\pi d}\arg(z_i)\right)$$

wherein $\lambda$ is the wavelength of the reflected signal and d is the distance between two receiving antennas. Some of the roots, however, can be disregarded as will be explained below.

According to one embodiment, only D roots $z_i$ located inside a unit circle in the complex plane and closest to the unit circle are considered. In other words, only roots with an absolute value $|z_i|\leq 1$ are considered and among these only D roots (corresponding to the number of targets) with the largest absolute values are used. Generally, J(z) is a polynomial with an order of 2(M−1). The roots occur in mirrored pairs in relation to the unit circle. Of the M−1 roots within the unit circle, exactly D closest to the unit circle are selected. Ideally, in absence of noise, the roots would lie exactly on the unit circle.

In order to facilitate detection of an occupant, further information about the possible positions of an occupant can be used to exclude certain roots. For each vehicle seat, an angle interval can be defined and only roots $z_i$ corresponding to an angle of arrival $\theta_i$ within an angle interval can be considered. Each angle interval and has a lower limit and an upper limit. For example, for the three seats of a rear bench, the angle intervals could be [−75°; −18° ], [−12°; 12° ] and [18°; 75]. Any angle of arrival $\theta_i$ outside any of these intervals can be discarded as not representing an occupant. Accordingly, any root $z_i$ that corresponds to such an angle of arrival does not need to be taken into account.

As mentioned above, in the absence of noise the roots would lie exactly on the unit circle. Even when noise is present, the roots that are closest to the unit circle have the highest probability of representing an occupant. Apart from simply choosing D roots $z_i$ closest to the unit circle, irrespective of how close they are to the unit circle, a lower boundary for the absolute value of the roots can be defined. According to such an embodiment, an inner circle having a radius of less than 1 is defined and only roots $z_i$ outside the inner circle and inside the unit circle are considered. The radius of the inner circle may be e.g. between 0.5 and 0.8, or between 0.65 and 0.75.

As mentioned above with respect to range gating, the number of samples used for the covariance matrix can be reduced, even significantly. This mostly applies for the various MUSIC methods described above. It is even possible that between 1 and 5 samples are considered for calculating the covariance matrix $\hat{R}$, wherein each sample represents a range value in range representation. In the extreme case of only one sample, the range interval has effectively been reduced to a single range value. However, if this range value is chosen properly, and effective determination of an angle of arrival is possible. The single sample should correspond to a range value that is characteristic for an occupant, but e.g. non-characteristic for the vehicle seat itself or a small object like a bag placed on the vehicle seat.

The detection of an occupant is usually performed framewise, i.e. for each frame of a measurement, wherein each frame comprises a plurality of blocks. Each block in turn corresponds to at least one modulation period (normally one for each transmit antenna). Depending on various factors, an accurate detection of an occupant is normally not possible for each frame of the sample data. However, it is reasonable to assume that an occupant will be detected in a relatively high number of frames, while false detections occur in a lower number of frames. According to one embodiment of the method, for each seat, an associated area in the complex plane is defined and for each frame, which corresponds to a plurality of modulation periods of the detection signal, a counter for this associated area is increased if at least one root $z_i$ is located in this associated area and decreased if there is no root $z_i$ in this associated area and the seat is identified as occupied if the counter exceeds a predefined threshold. The associated area in the complex plane may be defined using the above-mentioned angle interval (which corresponds to a normally different angle interval in the complex plane) and the above-mentioned inner circle and unity circle. For each frame, the roots inside each associated area are counted. If the number of roots in an associated area is nonzero, the counter for this seat is increased, e.g. by the number of roots. If the number of routes in an associated area is 0, the counter for this seat is decreased, e.g. by 1. The counter can be checked after each frame or when all frames have been processed. If the counter for one seat has exceeded a predefined threshold, the seat is identified as occupied. If the counter is below this threshold after all frames have been processed, the seat is identified as empty.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
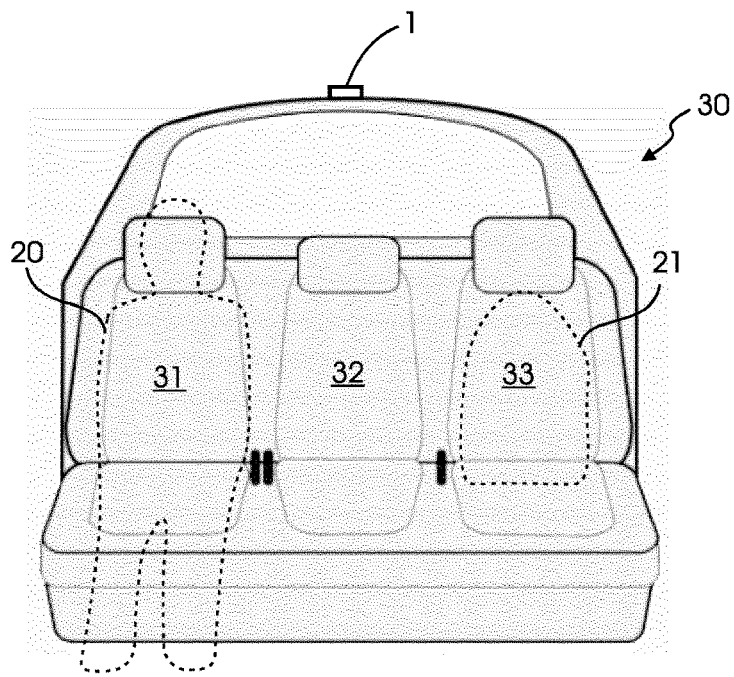
FIG. 1 is a schematic front view of a vehicle interior with a system for performing embodiments of the inventive method for occupancy detection.

FIG. 1 schematically shows the interior of the vehicle 30 with a rear bench comprising a left seat 31, a middle seat 32 and a right seat 33. A system 1 for occupancy detection is installed in a ceiling above the rear seat region of the vehicle 30. It can e.g. be mounted behind the headliner in order to illuminate all rear seats 31, 32, 33 in the best possible way. The system 1 is adapted for occupancy detection, which may also include detection of unattended children that are left behind in the vehicle 30.

Figure 2:
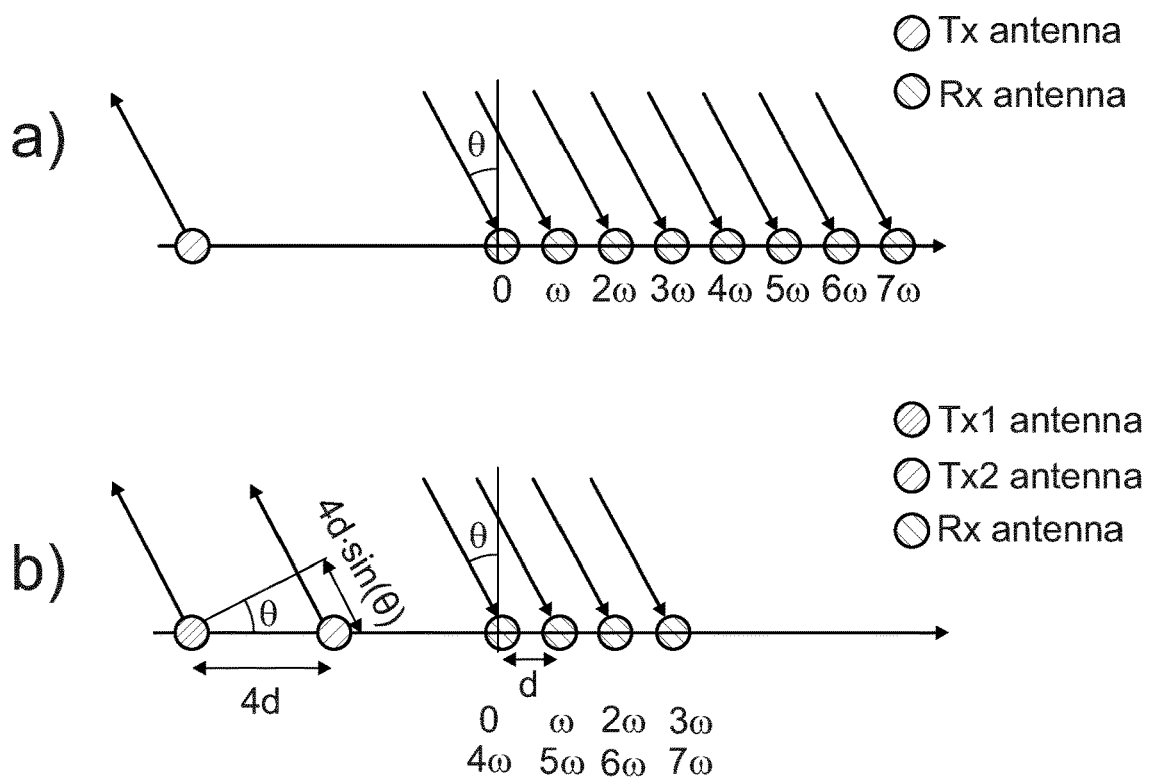
FIG. 2 is a schematic representation of two possible antenna arrays for the system from FIG. 1.
Figure 3:
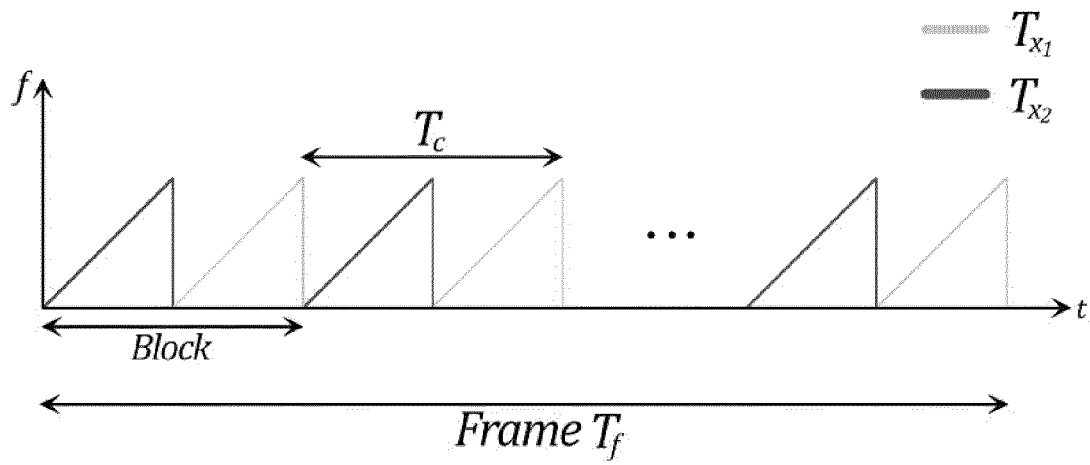
FIG. 3 shows a time evolution of the frequency of a detection signal from the antenna array from FIG. 2.

FIG. 2 schematically shows two versions of an antenna array that can be employed in the system 1. In each case, a plurality of receive antennas Rx are arranged as a uniform linear array (ULA) with a distance d between two receive antennas Rx. According to a first option, shown under letter a), the antenna array and is a SIMO system with a single transmit antenna Tx and eight receive antennas Rx. According to a second option, shown under letter b), the antenna array is a MIMO system with two transmit antennas Tx separated by a distance 4d and four receive antennas Rx. As illustrated in FIG. 2, in each case, eight different relative phase shifts from 0 to 7 co occur between the transmit antenna(s) Tx and the receive antennas Rx, with ω=4d·sin θ. Each combination of a receive antenna Rx and a transmit antenna Tx corresponds to one (virtual) channel. The system 1 is configured to transmit an FMCW radar signal, which is herein referred to as a detection signal. If the MIMO configuration is used, it is important that the receive antennas Rx can separate reflected signals corresponding to the different transmit antennas Tx. In this example, the transmit signals of different transmit antennas Tx are separated by Time Division Multiplexing (TDM), which is illustrated in FIG. 3. Each of the transmit antennas Tx generates a series of alternating chirps, i.e. when one transmit antenna Tx generates a chirp, the other transmit antenna Tx is inactive. A pair of chirps forms a block of the transmit signal, and a frame comprises a plurality of blocks (e.g. 16 blocks, i.e. 16 chirps from each transmit antenna). During operation, a series of frames are emitted. In this example, the operating frequency is from 79 GHz to 109 GHz, corresponding to a base wavelength λ of 3.8 mm. The frequency slope of each chirp is 70 MHz/μs. The period of a frame is 62.5 ms, corresponding to 16 frames/sec. The distance d is 1.9 mm (i.e. λ/2).

Figure 4:
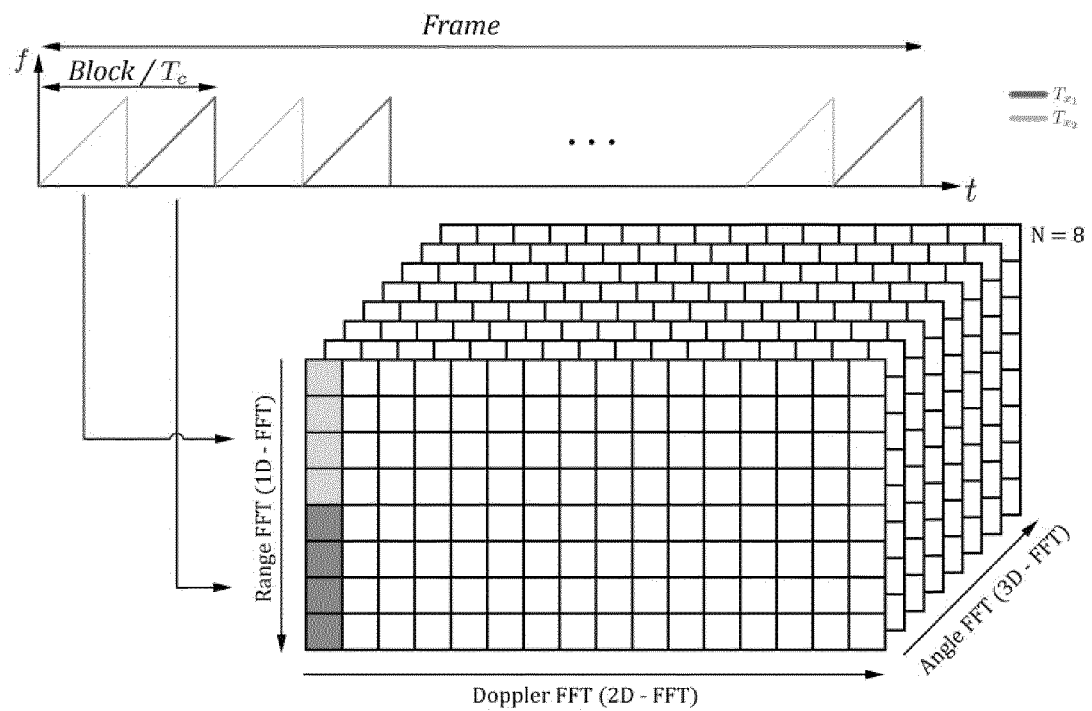
FIG. 4 illustrates the construction of a radar data cube.

The detection signal is at least partially reflected by the interior of the vehicle 30 and, apart from the vehicle seats 31, 32, 33, it may be reflected in by an occupant 20 or an inanimate object like a backpack 21 disposed on one of the vehicle seats 31, 32, 33. At least a portion of the reflected signal is received by the receive antennas Rx. This is recorded as sample data, the structure of which may be illustrated in form of a radar data cube and as shown in FIG. 4. The radar data cube intuitively illustrates the processing data of the radar. It can be described as a three-dimensional arrangement of sample bins. One dimension of the cube corresponds to a number M of channels, in this case M=8. A second dimension corresponds to the number K of data samples (or data snapshots) recorded during one block of the signal, in this case K=256. The third dimension corresponds to total number of blocks of the recording. One could also say that the second dimension corresponds to fast time, while the third dimension corresponds to slow time. During the transmission of two chirps, one column of the cube is filled for all M channels. Over the duration of one frame, the remaining columns are filled. It is possible, though, that the recording comprises a plurality of frames, each of which comprises a certain number of blocks.

Performing an FFT over all channels would result in an angle information of the scene (Angle FFT). This is normally done according to prior art, but yields unsatisfactory angular resolution. Performing an FFT over all columns (corresponding to slow time) would yield velocity information (Doppler FFT). Performing an FFT over a single column yields range information (Range FFT).

Figure 15:
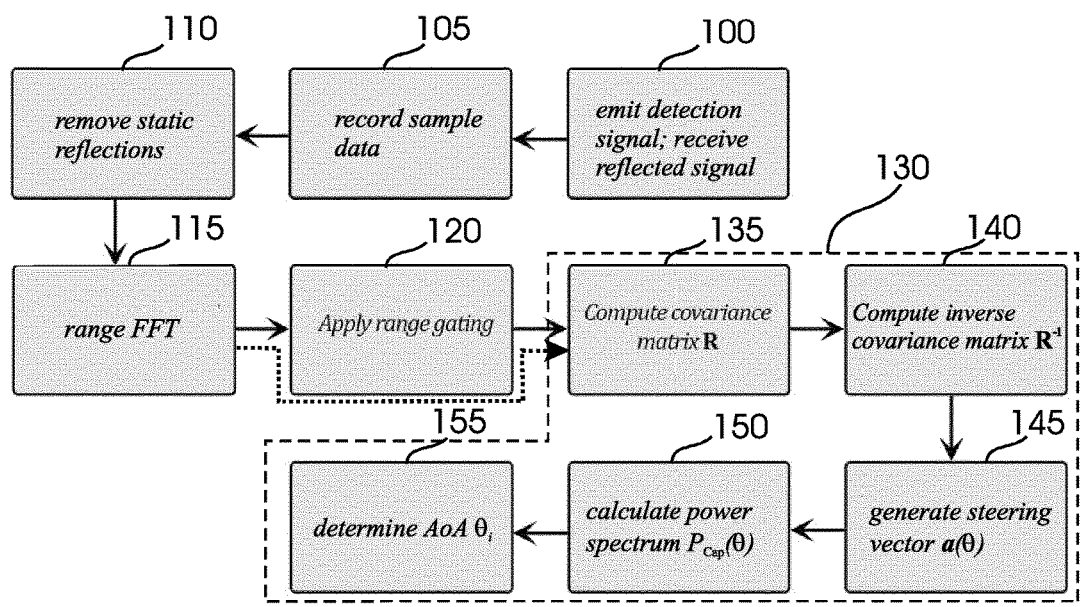
FIG. 15 is a flowchart illustrating a first embodiment of a method according to an embodiment of the invention.
Figure 16:
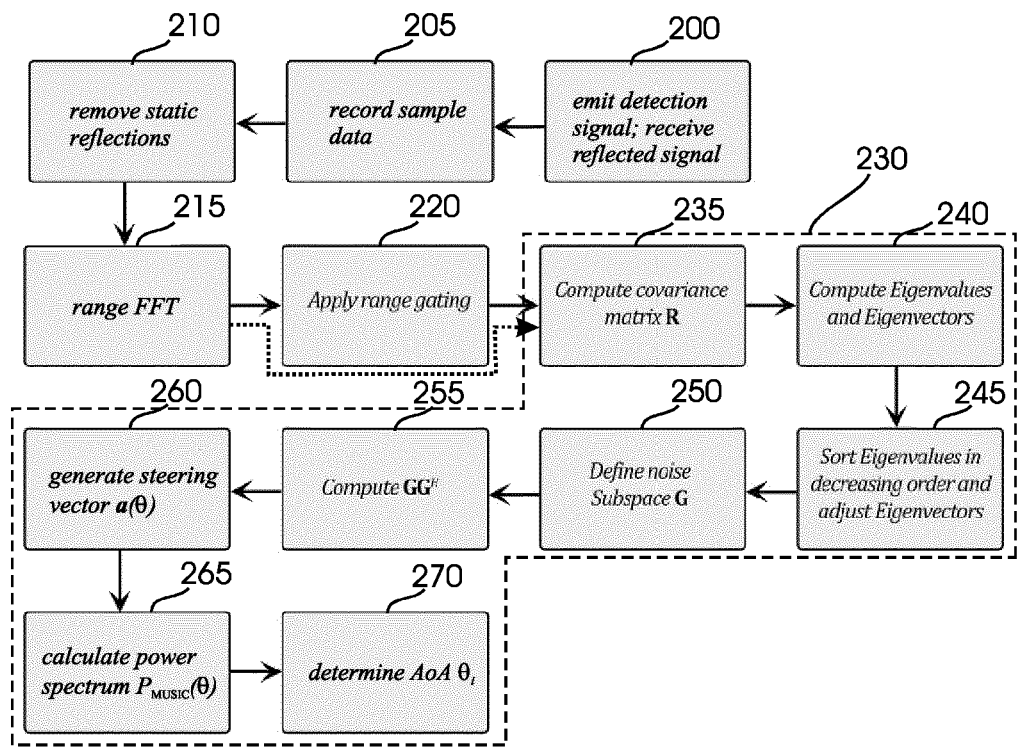
FIG. 16 is a flowchart illustrating a second embodiment of a method according to an embodiment of the invention.
Figure 17:
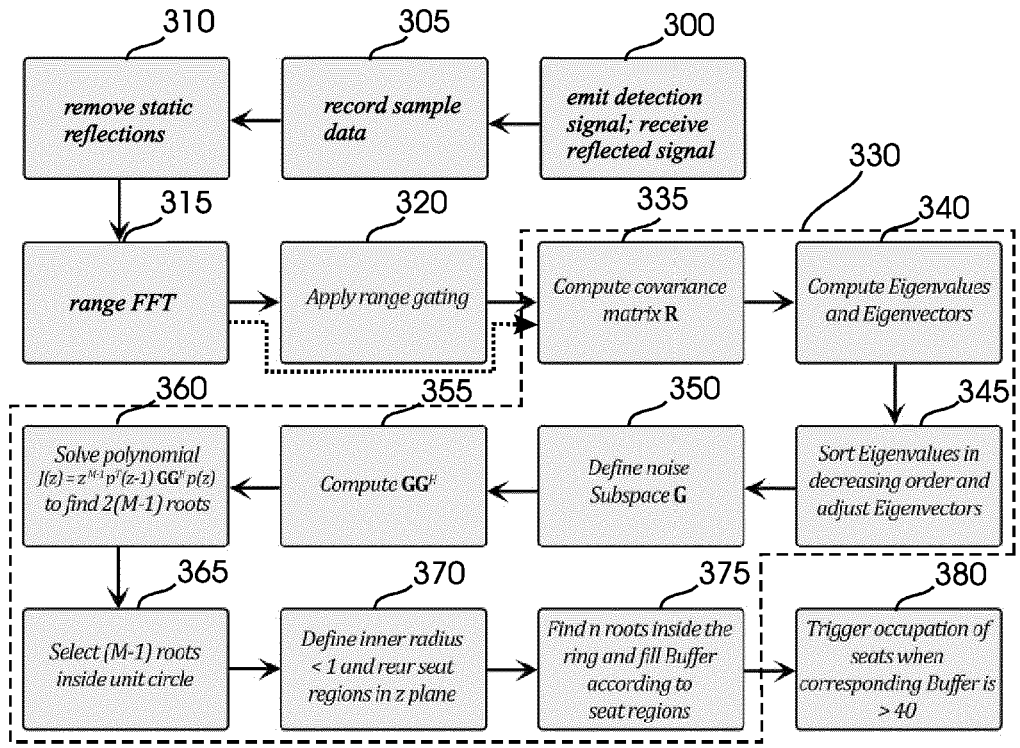
FIG. 17 is a flowchart illustrating a third embodiment of a method according to an embodiment of the invention.

Embodiments of the inventive method will now be explained with reference to the flowcharts in FIGS. 15 to 17. It should be noted that the sequence of the steps in each flowchart could be changed or that some steps that are shown to happen sequentially could be performed simultaneously.

According to a first embodiment, which is explained with reference to the flowchart in FIG. 15, a Capon method (also known as the Minimum Variance Distortionless Response (MVDR) algorithm) is used. In a first step, at 100, the detection signal is emitted and the reflected signal is received. At 105, the sample data is recorded. Then, at 110, a portion of the sample data corresponding to reflections by static objects is removed. This may be done by taking the average of a specific sample bin (e.g. the first sample bin in each column) over all columns and subtracting this average from every sample bin. At 115, a range FFT is performed to transfer the sample data into range representation.

Figure 11:
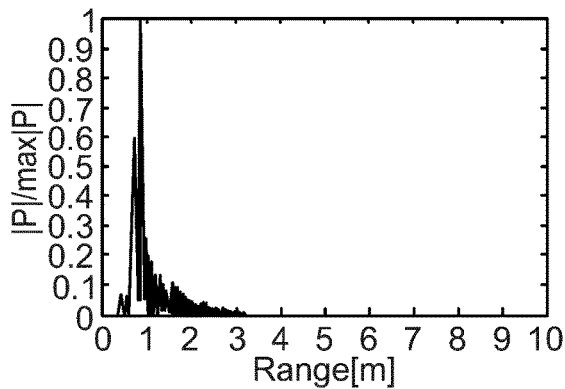
FIG. 11 is diagram showing a power spectrum as a function of range.

At 120, a range gating is performed, which means that all sample data not corresponding to a certain range interval are discarded. The reason for this can be seen in FIG. 11, which illustrates a typical power spectrum of the reflected signal in range representation. Most of the relevant spectral density is located in a range from 30 cm to 110 cm, wherefore the range interval may be chosen accordingly. Also, in this example, any object further away than 110 cm would be located inside or even behind a vehicle seat 31, 32, 33. Range gating greatly reduces the number of (relevant) sample bins in each column, e.g. from 256 to 21.

Afterwards, the Capon method is performed (at 130). At 135, a sample covariance matrix $\hat{R}$ is calculated as:

$$\hat{R} = \frac{1}{K}\sum_{k=0}^{K-1} x[k]x^H[k]$$

wherein x[k] is an M-dimensional output vector representing the sample data in each channel in range representation and K is the number of data samples considered (e.g. K=21 after range gating). At 140, an inverse sample covariance matrix $\hat{R}^{-1}$ is calculated.

Then, at 145, a steering vector a(θ) for each of a plurality of scanning angles θ is generated. The steering vector a(θ) corresponding to a scanning angle θ is given by a column vector and for a uniform linear array with M channels it is defined as $$a(\theta) = \begin{bmatrix} 1 \\ e^{j\left(\frac{2\pi d \sin\theta}{\lambda}\right)} \\ \vdots \\ e^{j\left(\frac{2\pi(M-1)d\sin\theta}{\lambda}\right)} \end{bmatrix} \in \mathbb{C}^{M\times 1}$$

wherein λ is the wavelength of the reflected signal and d is the distance between two receiving antennas.

When the covariance matrix and the steering vector have been determined, a Capon power spectrum $P_{Cap}(\theta)$ is calculated (at 150) with $$P_{Cap}(\theta) = \frac{1}{a^H(\theta)\hat{R}^{-1}a(\theta)}$$

Figure 5:
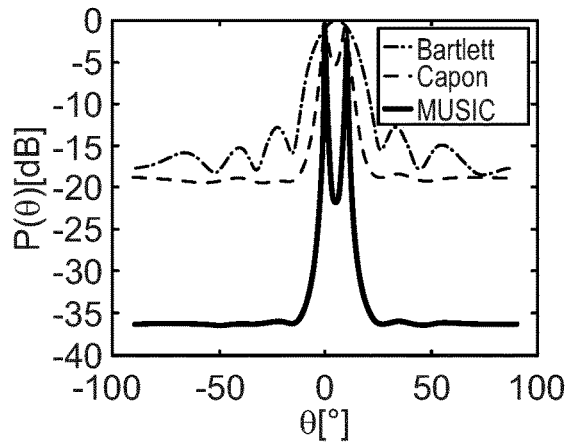
FIG. 5 is a first comparative diagram of power spectra derived from different methods according to embodiments of the invention.
Figure 6:
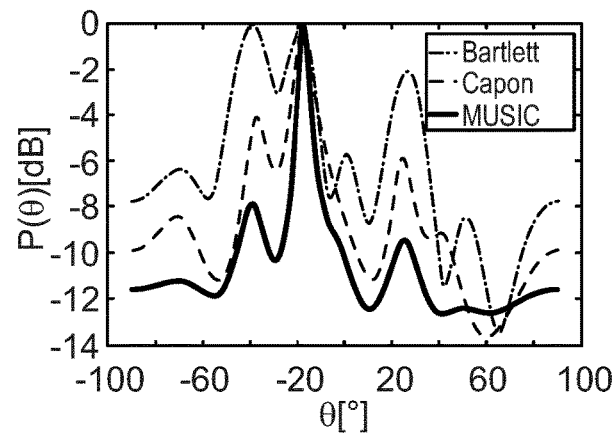
FIG. 6 is a second comparative diagram of power spectra derived from different methods according to embodiments of the invention.

Then, at 155, at least one angle of arrival $\theta_i$ can be determined by examining the peaks of the Capon power spectrum $P_{Cap}(\theta)$. In FIG. 5 and FIG. 6, which respectively show the power spectrum for the Bartlett method and the Capon method, it can be seen that the latter shows an improved signal-to-noise ratio. Also, in FIG. 5, which represents a simulation based on two targets disposed at 0° and 10°, respectively, the Bartlett method is unable to resolve two separate peaks, while the Capon method shows these peaks clearly. In FIG. 6, which represents the situation illustrated in FIG. 1 with the occupant 20 on the left seat 31 and the backpack 21 on the right seat 33, the peak resulting from the backpack 21 at around 25° has about half the height of the peak from the occupant 20 at about −15°. With the Bartlett method, the respective peaks have a similar height, making it nearly impossible to distinguish between an occupant 20 and an inanimate object 21.

According to another embodiment, which will now be explained with reference to FIG. 16, a MUSIC (multiple signal classification) method is employed. In a first step, at 200, the detection signal is emitted and the reflected signal is received. At 205, the sample data are recorded. Then, at 210, a portion of the sample data corresponding to reflections by static objects is removed. At 215, a range FFT is performed to transfer the sample data into range representation. At 220, range gating is performed.

At 230, the MUSIC method starts. At 235, the sample covariance matrix $\hat{R}$ is calculated as described above with respect to the Capon method. At 240, the eigenvalues and eigenvectors of the sample covariance matrix $\hat{R}$ are calculated. Assuming that all columns of $\hat{R}$ are linearly independent, there will be M eigenvectors with corresponding eigenvalues, some of which eigenvalues could possibly be identical.

Then, at 245, the eigenvalues are sorted in descending order and the eigenvectors are adjusted. With D being a number of targets, M−D smallest eigenvalues and corresponding eigenvectors are selected to determine a noise subspace G (at 250). At 255, the product $GG^H$ is calculated.

At 260, a steering vector $a(\theta)$ for each of a plurality of scanning angles θ is generated as explained above with reference to the Capon method. Then, at 265, a MUSIC power spectrum $P_{MUSIC}(\theta)$ is calculated with $$P_{MUSIC}(\theta) = \frac{a^H(\theta)a(\theta)}{a^H(\theta)GG^Ha(\theta)}$$

If $a(\theta)$ is normalized, this can be simplified as:

$$P_{MUSIC}(\theta) = \frac{1}{a^H(\theta)GG^Ha(\theta)}$$

Figure 12:
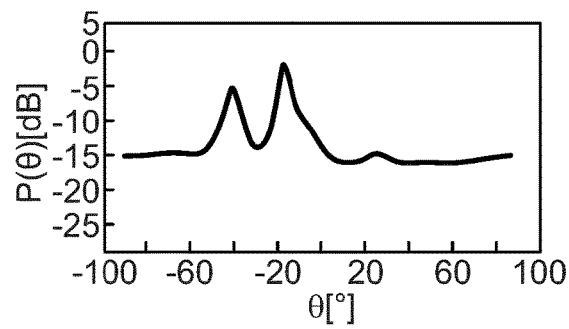
FIG. 12 is a diagram showing a power spectrum derived from a method according to embodiments of the invention.

At 270, at least one angle of arrival $\theta_i$ can be deduced by examining the peaks of the MUSIC power spectrum $P_{MUSIC}(\theta)$. As can be seen from both FIGS. 5 and 6, results can still be improved compared to the Capon method. In the scenario of FIG. 5, the signal-to-noise ratio is improved by about 17 dB as compared to Capon. The two peaks are more clearly separable. In FIG. 6, a single peak (at −15°) representing the occupant 20 is much more pronounced than in the Capon power spectrum, with a side peak at about −40° being reduced and the peak at about 25° corresponding to the backpack 21 being even lower. It should be noted that the diagram in FIG. 6 corresponds to a variant where no range gating has been performed as indicated by the dotted arrow in FIGS. 15-17, i.e. steps 120 and 220, respectively, have been omitted. FIG. 12 shows a MUSIC power spectrum $P_{MUSIC}(\theta)$ where range gating has been performed. Although the difference between the main peak at −15° and the side peak at −40° is not as pronounced as in FIG. 6, the peak corresponding to the backpack 21 has almost disappeared.

According to a third embodiment, which will be described with reference to FIG. 17, a different method is used which can be referred to as a root-MUSIC method, which starts at 330. The steps 300 to 355 are identical to the steps 200 to 255 described above. After determining the noise subspace, the roots $z_i$ of a root-MUSIC polynomial J(z) with $$J(z) = z^{M-1}p^T(z^{-1})GG^Hp(z)$$

are determined at 360, where $$p(z) = \begin{bmatrix} z^0 \\ \vdots \\ z^{M-1} \end{bmatrix}.$$

Figure 7:
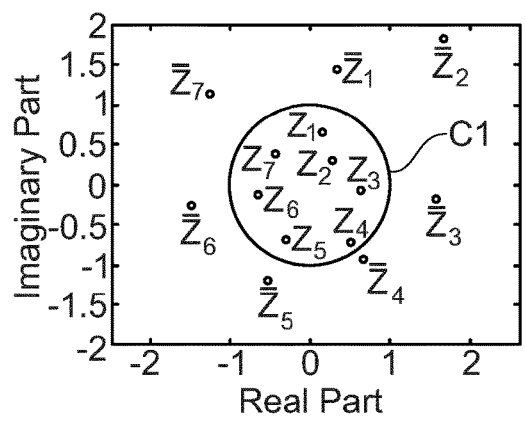
FIG. 7 is a first diagram showing positions of roots of a MUSIC polynomial in the complex plane.
Figure 8:
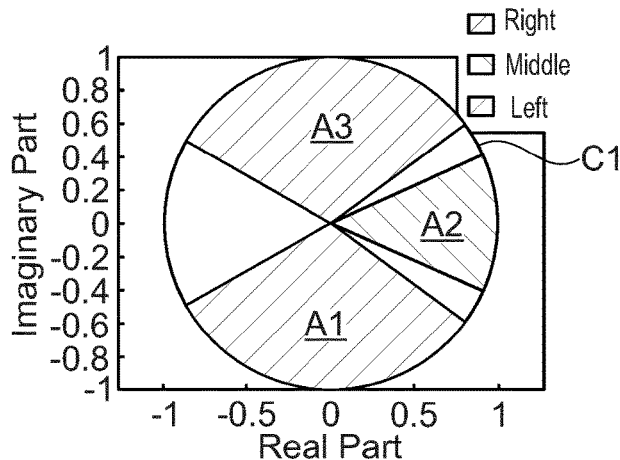
FIG. 8 is a first diagram showing associated areas in the complex plane.
Figure 9:
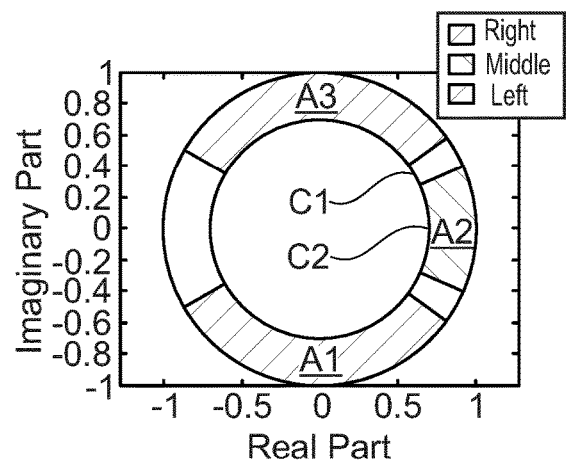
FIG. 9 is a second diagram showing associated areas in the complex plane.
Figure 10:
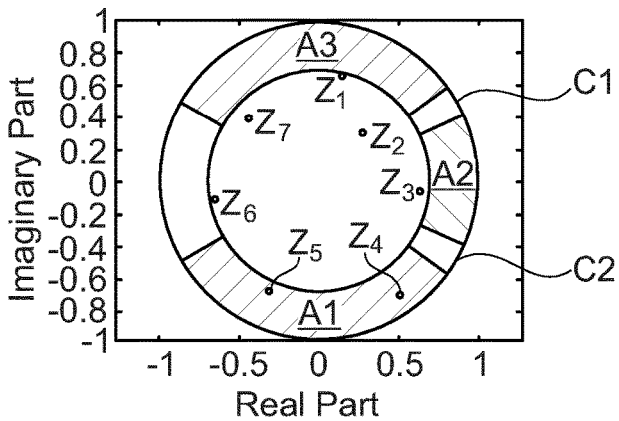
FIG. 10 is a diagram corresponding to FIG. 9 which also shows positions of roots of a MUSIC polynomial.

FIG. 7 is a diagram illustrating the positions of the roots $z_i$ in relation to a unit circle C1 in the complex plane. Generally, the polynomial J(z) has a total of 2(M−1) roots, i.e. in this case 14 roots $z_i$. As can be seen in FIG. 7, the roots occur pairwise with 7 roots $z_i$ inside the unit circle C1 and 7 roots $\bar{z}_i$ outside the unit circle C1. At 365, the M−1 roots $z_i$ inside the unit circle are selected. Furthermore, at 370, an inner radius for an inner circle C2 is defined. This inner radius is smaller than 1 and may e.g. be 0.7. Also, an angle interval is defined for each of the seats 31, 32, 33. For example, the angle intervals could be [−75°; −18°] for the left seat 31, [−12°; 12°] for the middle seat 32 and [18°; 75] for the right seat 33. With the boundaries defined by the unit circle C1, the inner circle C2 and the angle intervals, an associated area A1, A2, A3 can be defined for each of the vehicle seat 31, 32, 33, as illustrated in FIG. 9. In a simpler version of the method, the inner circle C2 could be omitted as a criterion, as illustrated in FIG. 8. Now, at 375, only roots $z_i$ inside the respective associated area A1, A2, A3 are considered. In the example illustrated in FIG. 13, two roots $z_4$, $z_5$ are located in the associated area A1 of the left seat 31. Therefore, a counter of buffer for the left seat 31 is increased by 2. In corresponding buffers for the middle seat 32 and the right seat 33 are decreased by 1, because no roots are located in their respective associated area A2, A3. At 380, each buffer is compared to a threshold, in this case 40, and when the threshold is exceeded, the corresponding seat 31, 32, 33 is considered occupied. In this case, some safety-relevant system like a seatbelt reminder for the respective seat 31, 32, 33 can be triggered.

When the roots $z_i$ in have been determined, an angle of arrival $\theta_i$ can also be determined explicitly for each root $z_i$, as $$\theta_i = \arcsin\left(\frac{\lambda}{2\pi d}\arg(z_i)\right)$$

Figure 13:
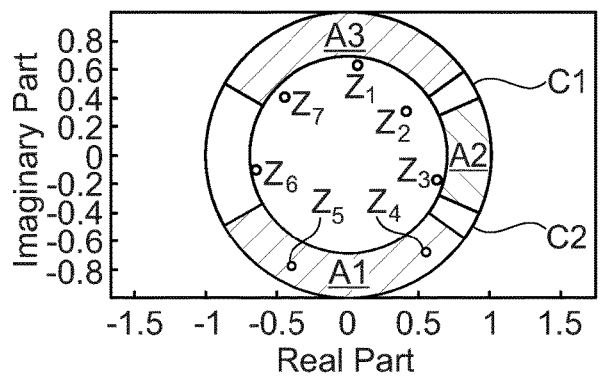
FIG. 13 is a never diagram showing associated areas and positions of roots of a MUSIC polynomial in the complex plane.
Figure 14:
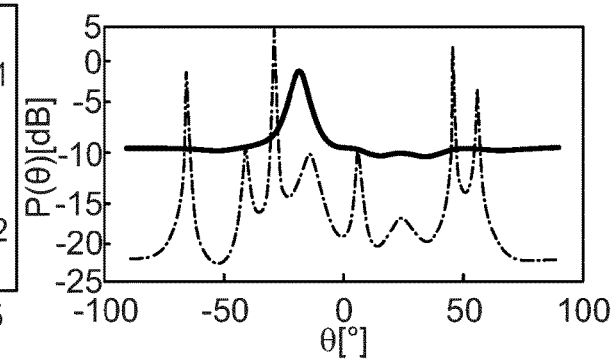
FIG. 14 is a third comparative diagram of power spectra derived from different methods according to embodiments of the invention.

FIGS. 13 and 14 refer to an embodiment where the range gating has been restricted so that only a single sample, corresponding to a single range value, has been used. In this case, the sample corresponds to a range value of 70 cm. As can be seen in FIG. 13, using the root-MUSIC method, the occupant 20 can be successfully identified by the two roots $z_4$, $z_5$ that are located in the associated area A1 of the left seat 31. Using the spectral MUSIC method, the result of which is shown as the black line in FIG. 14, a single peak can be identified at −15°, leading to a successful identification of the occupant 20. Using a single sample for the Capon method, on the other hand, yields a power spectrum that does not allow for any identification, as shown by the grey line in FIG. 14. The spectrum contains a large number of peaks which are spread over the entire angle range. The reason for this can be seen in that the Capon method requires calculation of the inverse covariance matrix $\hat{R}$ to calculate the spectrum. With a single sample, however, the columns of the covariance matrix k become correlated, wherefore the inverse covariance matrix $\hat{R}^{-1}$ cannot be successfully calculated. Accordingly, the Capon algorithm cannot be used if the columns of the covariance matrix $\hat{R}$ are correlated.

The invention claimed is:

1. A method for occupancy detection for at least one vehicle seat, using at least one transmit antenna and a plurality of receive antennas, the method comprising:

emitting a detection signal with each transmit antenna onto at least one vehicle seat, which detection signal is a frequency-modulated continuous-wave radar signal, and receiving with each receive antenna a reflected signal;

recording sample data representing the reflected signal, the sample data having M channels, with M=N1·N2, where N1 is the number of transmit antennas and N2 is the number of receive antennas;

for each channel, removing a component from the sample data that corresponds to a reflection from a static object; and applying a frequency estimation method to the sample data to at least implicitly determine at least one angle of arrival $\theta_i$ corresponding to a position of an occupant on a vehicle seat, wherein the frequency estimation method is a multiple signal classification (MUSIC) method and includes:

calculating a sample covariance matrix $\hat{R}$;

calculating eigenvalues and eigenvectors of the sample covariance matrix $\hat{R}$;

sorting the eigenvalues in descending order and, with D being a number of targets, selecting M−D smallest eigenvalues and corresponding eigenvectors to determine a noise subspace G; and calculating roots $z_i$ of a root-MUSIC polynomial $J(z)$ with $$J(z) = z^{M-1} p^T(z^{-1}) G G^R p(z)$$

wherein $$p(z) = \begin{bmatrix} z^0 \\ \vdots \\ z^{M-1} \end{bmatrix}$$

and each root $z_i$ corresponds to an angle of arrival $\theta_i$, wherein for each seat, an associated area in the complex plane is defined and for each frame, which corresponds to a plurality of modulation periods of the detection signal, a counter for this associated area is increased if at least one root $z_i$ is located in this associated area and decreased if there is no root $z_i$ in this associated area and the seat is identified as occupied if the counter exceeds a predefined threshold.

2. The method according to claim 1, wherein the method uses only D roots $z_i$ located inside a unit circle in the complex plane and closest to the unit circle.

3. The method according to claim 1, wherein for each vehicle seat, an angle interval is defined and wherein the method uses only roots $z_i$ corresponding to an angle of arrival $\theta_i$ within an angle interval.

4. The method according to claim 1, wherein an inner circle having a radius of less than 1 is defined and wherein the method uses only roots $z_i$ outside the inner circle and inside the unit circle.

5. The method according to claim 1, wherein 1 to 5 samples are used for calculating the covariance matrix $\hat{R}$.

6. The method according to claim 1, wherein before applying the frequency estimation method, a range gating is performed for each channel by:

transforming the sample data into a range representation; and only considering a portion of the sample data corresponding to a predefined range interval, which includes a potential position of an occupant.

7. The method according to claim 1, wherein a plurality of transmit antennas is used.

8. The method according to claim 1, wherein transmit signals from different transmit antennas are separated by time division multiplexing.

9. The method according to claim 1, wherein the receiving antennas are arranged as a uniform linear array.

10. The method according to claim 1, wherein the frequency estimation method is a Capon method, and comprises:

calculating the sample covariance matrix $\hat{R}$ with $$\hat{R} = \frac{1}{K}\sum_{k=0}^{K-1} x[k] x^H[k]$$

wherein $x[k]$ is an M-dimensional output vector representing the sample data in each channel in range representation and K is the number of data samples considered;

calculating an inverse sample covariance matrix $\hat{R}^{-1}$;

generating a steering vector $a(\theta)$ for each of a plurality of scanning angles $\theta$; and calculating a Capon power spectrum $P_{Cap}(\theta)$ with $$P_{Cap}(\theta) = \frac{1}{a^H(\theta)\hat{R}^{-1}a(\theta)}$$

11. The method according to claim 1, wherein the method further comprises, after determining the noise subspace G:

generating a steering vector a(θ) for each of a plurality of scanning angles θ; and calculating a MUSIC power spectrum $P_{MUSIC}(\theta)$ with $$P_{MUSIC}(\theta) = \frac{a^H(\theta)a(\theta)}{a^H(\theta)GG^H a(θ)}.$$

* * * * *